E. F. SMITH.
MEAT HOLDER FOR SLICING MACHINES.
APPLICATION FILED OCT. 28, 1910.
1,049,932.
Patented Jan. 7, 1913.
2 SHEETS—SHEET 1.
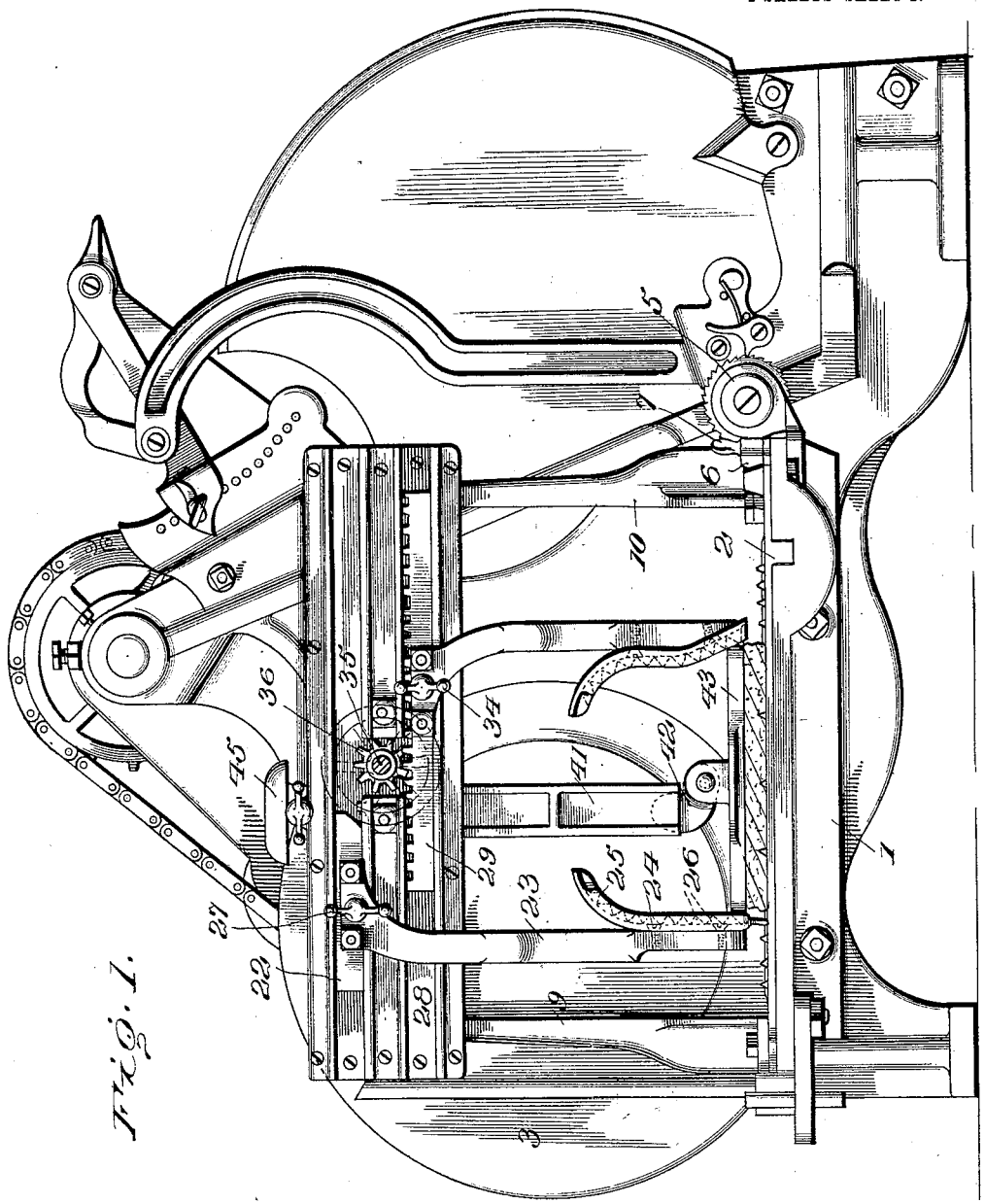
Witnesses
W. A. Williams
C. P. Wright Jr.
Inventor
E. F. Smith.
By A. S. Pattison
Attorney

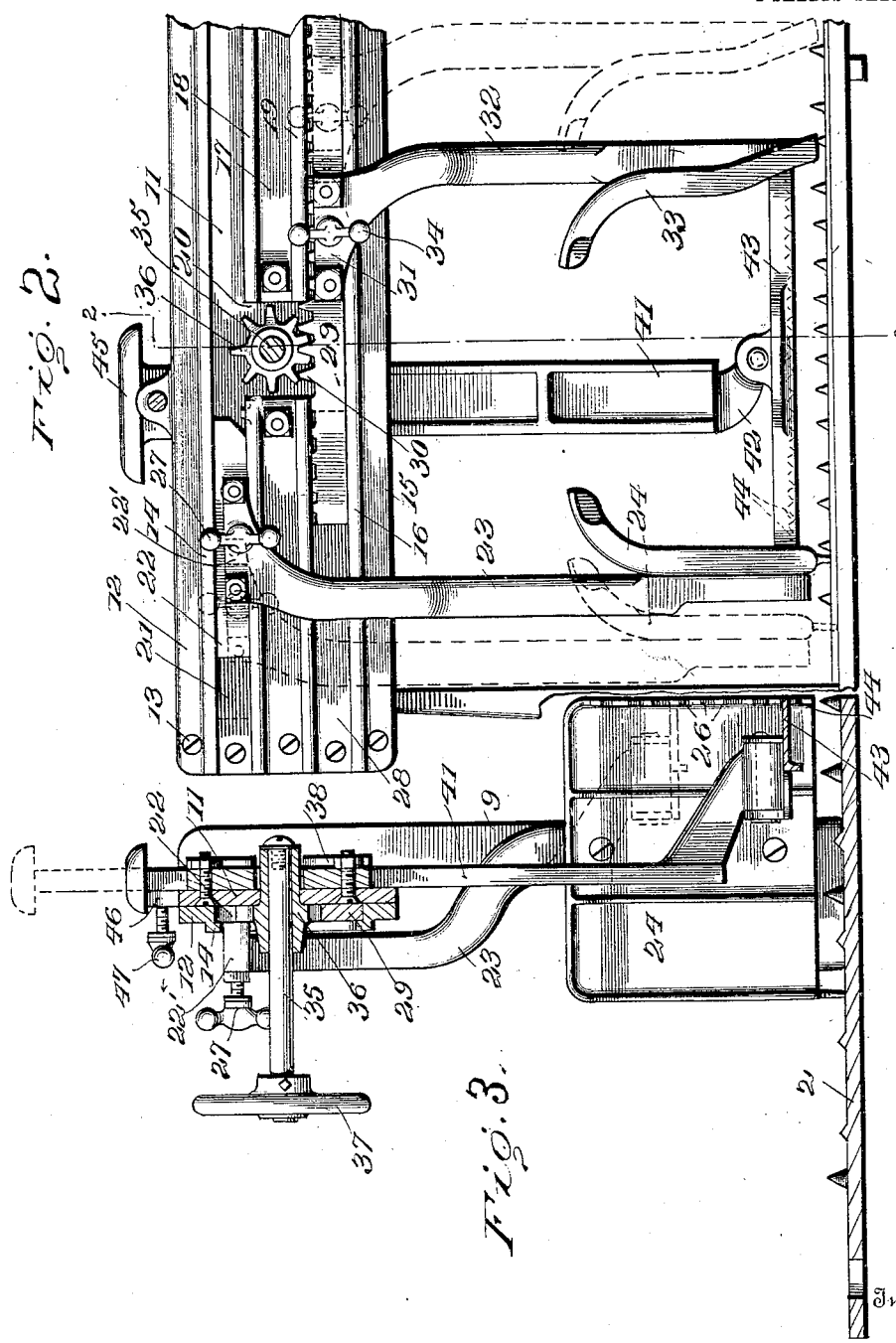

UNITED STATES PATENT OFFICE.

EDWARD F. SMITH, OF ROCHESTER, NEW YORK.

MEAT-HOLDER FOR SLICING-MACHINES.

1,049,932.

Specification of Letters Patent.

Patented Jan. 7, 1913.

Application filed October 28, 1910. Serial No. 589,641.

*To all whom it may concern:*

Be it known that I, EDWARD F. SMITH, a citizen of the United States, residing at Rochester, in the county of Monroe and State of New York, have invented certain new and useful Improvements in Meat-Holders for Slicing-Machines, of which the following is a specification, reference being had therein to the accompanying drawing.
My invention relates to improvements in meat holders for slicing machines.

The object of my invention is to provide a meat holder having movable side clamps for holding the meat in a central position, in combination with the usual clamping means for holding the meat firmly upon the support against vertical or sliding movement.

Another object of my invention is to provide a more simple, cheap and effective holder having certain details of structure hereinafter more fully described.

In the accompanying drawings—Figure 1 is an end view of my improved meat slicer covered in my Patent No. 892,192, dated June 30, 1908, showing my improved meat holder applied thereto. Fig. 2 is an enlarged side elevation of my improved meat holder removed, showing the side clamps in dotted lines in different positions. Fig. 3 is a vertical sectional view taken on the line 2—2, Fig. 2.

Referring now to the drawings, 1 represents the base of my improved slicing machine upon which my meat support 2 is supported, and 3 represents the rotating knife carried by the arm 4, all of which will need no further description, as the operation of the machine is fully shown and described in Patent No. 892,192, dated June 30, 1908. In this machine, as shown in the patent, the meat support is driven by a worm 5, and my improved meat holder is provided with a pivot member 6, which meshes with the worm 5 and is thus moved the desired distance at each operation of the knife. This pivoted member is provided with an upwardly extending handle 7, by means of which it may be thrown in or out of engagement with the worm 5.
The base 2, of the meat support, adjacent one end, is provided with the upwardly extending standards 9 and 10, and secured to the upper ends of said standards is a horizontal vertically disposed plate 11. The said plate 11 is provided at its upper end with a plate 12, removably secured thereon by means of screws 13 and having a downwardly projecting flange 14. Secured to the lower edge of the plate 11 is a plate 15 having an upwardly extending flange 16, and secured to the plate 13, by means of screws in the same way as the plate 12. Secured to the center of the plate 11, is a horizontal plate 17, secured thereto by means of screws in the same manner as the plates 12 and 15. This plate 17, at its upper edge is provided with a flange 18 and its lower edge with a flange 19. The said plate 17 is provided with a central cut-away portion 20, as will be hereinafter more fully described.

Mounted in the upper guide 21, formed by the plates 12 and 17 and the flanges 14 and 18 carried thereby is a slide 22, having a block 22' formed thereon, which carries a downwardly extending arm 23, which carries at its lower end the broad meat engaging plate 24, having an inwardly curved upper end 25. The outer edge of this plate is provided with teeth 26. The slide 22 has a set screw 27, passing therethrough and which engages the face of the plate 11, and locks the slide in its adjusted position.

Within the lower guide 28, formed by the plates 15 and 17, and the flanges 19 and 18, is an elongated rack bar 29, having the teeth 30 on its upper edge, as clearly shown in the drawings. Carried by the rack bar 29 is a block 31 having a downwardly extending arm 32 rigidly carried thereby and carried by the lower end of the arm is a broad flat meat engaging plate 33, having its upper end curved inwardly and provided with teeth to correspond with that of the plate 24. The block 31 is provided with a set screw 34, which engages the plate 11, and locks the rack bar 28 against movement in the guide. The central plate 17, as heretofore stated, is cut away at the center and rotatably mounted in the plate 11 opposite the cut away portion is a shaft 35, carrying a pinion 36, meshing with the rack bar 29. The outer end of the shaft is provided with a hand wheel 37, by means of which the shaft is rotated for moving the rack bar to or from the center and thus moving the meat engaging plate 33 to or from the center.

Secured to the rear face of the plate 11, are two vertically disposed plates or cleats 38, having inwardly extending flanges, forming a guide-way in which is vertically movably mounted the bar 41, having its lower end turned to one side, as indicated at 42, and to which is pivotally connected the meat clamp 43, having the teeth 44 on its lower face. The bar 41 at its upper end is provided with an enlarged handle portion 45, whereby the bar may be raised or lowered as desired. In order to hold the bar 41 in its adjusted position, I provide the plate 11 with an upwardly extending ear 46, through which is screwed a set screw 47, engaging the bar 41 and locking it in its adjusted position.

In meat cutters of this character, it has become necessary to hold the meat on the support at the sides as well as clamping it upon the support, and it has been found necessary that both side clamps should be movable. As is understood the meat is placed upon the support at the center and the bar 41 pushed down until the clamp 43 firmly engages the meat and the same is then locked in this position by means of the set screw 47. The clamping plate 24 is then moved over until it engages the side of the meat and is locked by the set screw 27. The hand wheel 38 is then turned to the right which, through the pinion 26 and the rack-bar 28, moves the meat clamp 33 toward the center until it firmly clamps the meat and the set screw 34 is then tightened until the rack bar 28 is locked against movement in the guideway, as heretofore described. It has become very essential to have both the side clamps movable, as this allows an irregular piece of meat to be placed in the center of the meat support. Where only one side clamp is movable, it often happens that an irregular piece of meat will extend over the side of the meat support and it is necessary to trim up the meat to prevent it from extending beyond the support.

While I have shown and described my improved clamp applied to a slicing machine of the character shown and described in Letters Patent No. 892,192, it will be understood that I do not care to limit myself to the same, as the device could be applied to other machines regardless of the feeding mechanism.

Having thus described my invention, what I claim and desire to secure by Letters Patent is—

1. A meat holder for slicing machines, comprising a base, two horizontally movable side meat clamps carried by the base, and a vertically movable top meat clamp working between the side clamps.

2. A meat holder for slicing machines, comprising a base, a horizontally movable side meat clamp carried by the base, a second horizontal side meat clamp carried by the base, means for moving the second clamp toward the first clamp and a vertically movable top meat clamp working between the said meat clamp.

3. A meat holder for slicing machines, comprising a base, a horizontally movable side meat clamp carried by the base, a second horizontally movable side meat clamp carried by the base, means for moving the second clamp toward the first clamp, means for locking the clamping members in their adjusted position, a vertically movable top meat clamp working between the side meat clamp and means for locking said top clamp in its adjusted position.

4. A meat holder for slicing machines, comprising a base, a frame supported upon the base, a movable side meat clamp carried by the frame, a second movable side meat clamp carried by the frame, means for moving the second clamp toward the first clamp, means for locking the clamped members in their adjusted position, a vertically movable top meat clamp and means for locking said top clamp in its adjusted position.

5. A meat holder for slicing machines, comprising a base, a horizontally movable clamping member on the base, a second horizontally movable clamping member on the base, a rack carried by the said second clamping member and a pinion rotatably supported upon the base and engaging the rack, whereby the clamping member carried by the rack is rapidly adjusted to or from the other clamping member.

6. A meat holder for slicing machines comprising a base, a vertically movable meat clamp carried by the base, horizontally movable clamping members carried by the base and means for locking said clamping members in their adjusted position.

7. A meat holder for slicing machines comprising a base, a vertically movable clamping member carried by the base, means for locking said clamping member in its adjusted position, horizontally movable side clamping members carried by the base, means for locking one of said clamping members in its adjusted position, means for operating the other side clamping member and means for locking the operated member in its adjusted position.

8. A meat holder for slicing machines comprising a base, a vertically adjustable bar carried by the base, a horizontally pivoted meat clamping member secured to the lower end of the bar, means for locking said bar in its adjusted position and horizontally movable side clamping members adapted to be moved to and from each other.

9. A meat holder for slicing machines, comprising a base, standards carried by said base, a horizontally disposed plate carried by the upper end of said standards, a guide-way formed in the upper end of said horizontal plate, a clamping member horizontally adjustable in said guide-way, a second guide-way formed in the lower end of said horizontal plate, a rack bar in said second guide-way, a meat clamping member secured to the said rack bar, a horizontally pivoted pinion carried by the said plate and meshing with the rack bar, and means for rotating the pinion whereby the clamping member carried by the rack bar is moved to or from the first mentioned clamping member.

10. A meat holder for slicing machines, comprising a base, standards carried by the sides of said base, a vertically disposed plate carried by the upper ends of the standards, a vertically movable meat clamp carried by one side of the plate, two horizontally arranged guide-ways carried by the opposite side of the plate, a block movable horizontally in the upper guide-way, means for locking said block in its adjusted position in the guide-way, a downwardly extending arm carried by said block, a rack horizontally movable in the lower guide-way of the plate, an arm carried by said rack and extending downwardly, a meat clamp carried by the lower end of said arm, means for locking said rack bar in its adjusted position in the guide, a pinion horizontally journaled in the vertically disposed plate and meshing with the rack bar, and means for rotating said pinion whereby the clamping member carried by the rack bar is moved to or from the first mentioned clamping member.

11. A meat holder for slicing machines comprising a base, standards carried by the ends of said base, a vertically disposed horizontal plate carried by the upper ends of the standards and vertically arranged guide carried by one side of the plate, a bar vertically movable in said guide-way, a set-screw carried by the guide-way and engaging the said bar for locking the same in its adjusted position, a meat clamping member pivotally secured to the lower end of the bar, two horizontally arranged guide-ways in the opposite face of the vertically disposed plate, a block horizontally movable in the upper guide-way, a set-screw passing through the block and engaging the vertically disposed plate for locking the block in its adjusted position, a downwardly extending arm carried by the block and having a meat clamping member carried by the lower end, a rack bar horizontally movable in the lower guide-way carried by the plate, a set-screw passing through the rack bar and engaging the vertically disposed plate for locking the rack-bar in its adjusted position in the guide, a downwardly extending arm carried by the rack and having a clamping member carried by its lower end, a shaft horizontally pivoted in the vertically disposed plate and having operating means at its upper end, and a pinion carried by the shaft on the opposite side of the plate and meshing with the rack bar, whereby the rack is moved in the guide-way for moving the meat clamping member to or from the other meat clamping member.

12. A meat holder for slicing machines, comprising a base, two horizontally movable side meat clamps carried by the base, a vertically movable top meat clamp having a pivoted meat engaging member working between the side clamps.

13. A meat holder for slicing machines, comprising a base, a horizontally movable side meat clamp carried by the base, a second horizontally movable side meat clamp carried by the base, means for moving the second clamp toward the first clamp, means for locking the clamping members in their adjusted position, a vertically movable top meat clamp and a meat engaging foot pivoted thereto and working between the side clamps.

In testimony whereof I hereunto affix my signature in the presence of two witnesses.

EDWARD F. SMITH.

Witnesses:
 CHAS. LITTLE,
 MOLLIE KERSNER.

Copies of this patent may be obtained for five cents each, by addressing the "Commissioner of Patents, Washington, D. C."